United States Patent
Roth et al.

(10) Patent No.: US 8,511,228 B2
(45) Date of Patent: Aug. 20, 2013

(54) THERMAL INDICATORS

(75) Inventors: Joseph D Roth, Springboro, OH (US); Wendell B Halbrook, Jr., Waynesville, OH (US)

(73) Assignee: NCR Corporation, Duluth, GA (US)

(*) Notice: Subject to any disclaimer, the term of this patent is extended or adjusted under 35 U.S.C. 154(b) by 0 days.

(21) Appl. No.: 13/314,629

(22) Filed: Dec. 8, 2011

(65) Prior Publication Data

US 2012/0262529 A1 Oct. 18, 2012

Related U.S. Application Data

(62) Division of application No. 11/365,190, filed on Mar. 1, 2006, now Pat. No. 8,083,423.

(51) Int. Cl.
*B41F 33/00* (2006.01)

(52) U.S. Cl.
USPC .......................... 101/488; 101/484

(58) Field of Classification Search
USPC .................................. 101/484, 488
See application file for complete search history.

(56) References Cited

U.S. PATENT DOCUMENTS

| | | | | |
|---|---|---|---|---|
| 5,618,063 A | * | 4/1997 | Chang et al. | 283/67 |
| 5,712,673 A | * | 1/1998 | Hayashi et al. | 347/217 |
| 5,748,204 A | * | 5/1998 | Harrison | 347/2 |
| 5,873,604 A | * | 2/1999 | Phillips | 283/70 |
| 6,151,037 A | * | 11/2000 | Kaufman et al. | 347/2 |
| 6,203,069 B1 | * | 3/2001 | Outwater et al. | 283/88 |
| 6,452,873 B1 | * | 9/2002 | Holt et al. | 368/327 |
| 7,049,263 B2 | * | 5/2006 | Kumamoto | 502/126 |
| 7,387,984 B2 | * | 6/2008 | Yoneshige et al. | 503/207 |
| 7,914,213 B2 | * | 3/2011 | Scarton | 400/76 |
| 2005/0000657 A1 | * | 1/2005 | Bronson | 156/384 |

* cited by examiner

*Primary Examiner* — Anthony Nguyen
(74) *Attorney, Agent, or Firm* — Joseph P. Merhle; Michael Chan

(57) ABSTRACT

A thermal indicator using indicia formed by opaque ink applied to a thermal imaging material element is described. The ink is substantially the same color as the imaging element background and remains substantially hidden until the imaging element background changes color when heated. Time-temperature exposure indicating labels can be prepared using a printer with direct thermal type and ink jet type print heads.

12 Claims, 3 Drawing Sheets

THERMAL INDICATORS

RELATED APPLICATIONS

This application is a Divisional Application of, and claims priority to, U.S. application Ser. No. 11/365,190, filed Mar. 1, 2006, now U.S. Pat. No. 8,083,423 entitled "THERMAL INDICATORS," which is hereby incorporated by reference herein in its entirety for all purposes. This application is also related to the following other Divisional Applications of U.S. application Ser. No. 11/365,190, U.S. application Ser. Nos. 13/314,567 and 13/314,714.

BACKGROUND

Direct thermal printing is a recognized means of printing quietly without toners or inks. It is a relatively mature technology that has been around for over forty years. Its use by retailers for printing of cash register receipts, mailing labels, etc. is now commonplace.

In direct thermal printing, a print head selectively applies heat to paper or other sheet media comprising a substrate with a thermally sensitive coating. The coating changes color when heat is applied, by which "printing" is provided on the coated substrate. For dual-sided direct thermal printing, the sheet media substrate may be coated on both sides.

Time-temperature indicators using thermally sensitive color change materials are well known. For example, indicator devices that relay on diffusion of a dye through a polymer are described in U.S. Pat. Nos. 6,214,623; 5,746,792; 5,057,434; and 4,212,153.

SUMMARY

A thermal indicator using indicia formed by opaque ink applied to a thermal imaging material element is described. The ink is substantially the same color as the imaging element background and remains substantially hidden until the imaging element background changes color when heated. Time-temperature exposure indicating labels can be prepared using a printer with direct thermal type and ink jet type print heads.

Other features, advantages and variations of the invention will be apparent from the following description and the appended drawings and claims.

DESCRIPTION

By way of example, various embodiments of the invention are described in the material to follow with reference to the included drawings. Variations may be adopted.

Figure 1:
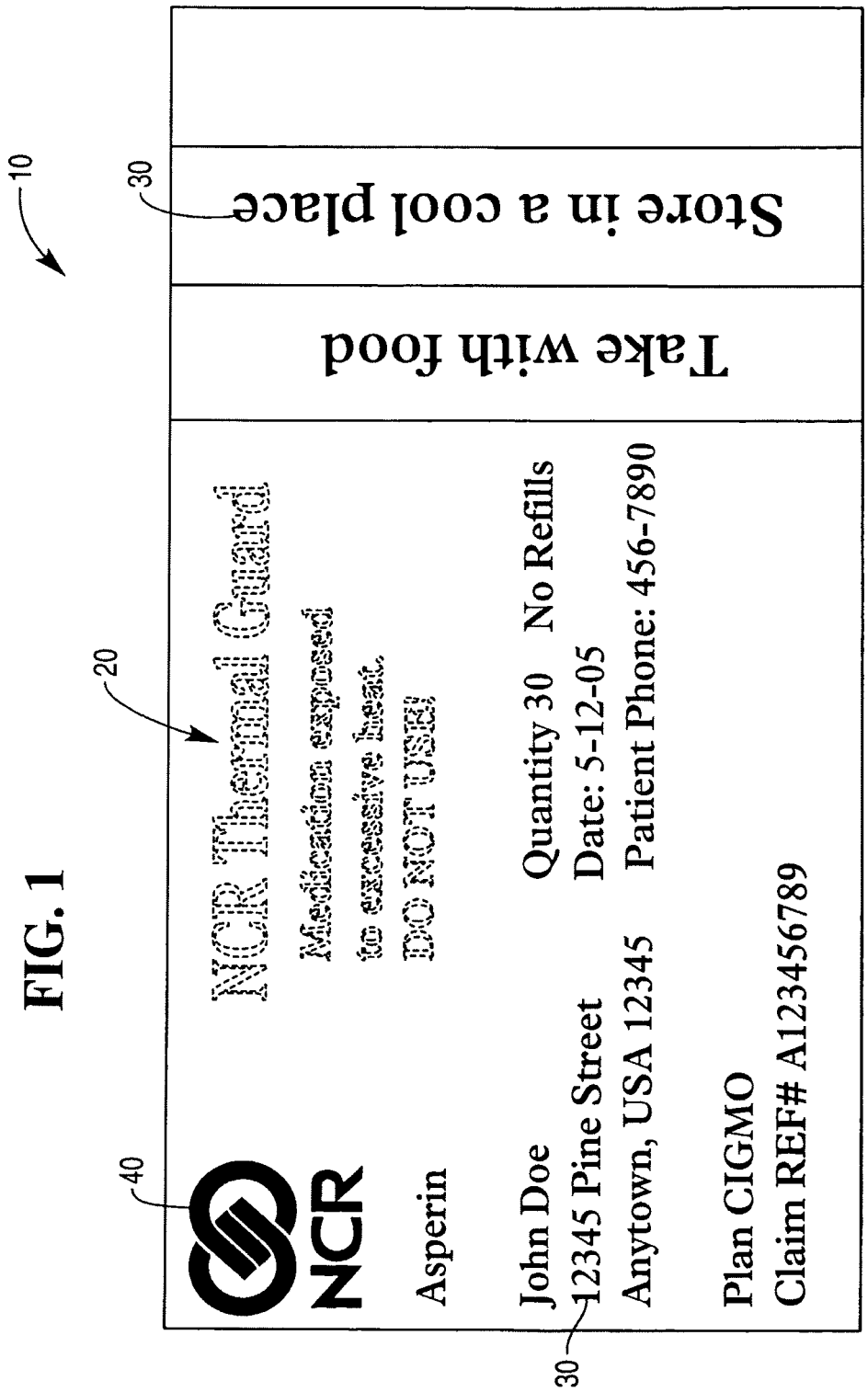
FIG. 1 illustrates a thermally sensitive label with hidden opaque printing before exposure to excessive heat.

FIG. 1 illustrates a thermally sensitive label 10 with hidden opaque printing 20 before exposure to excessive heat. The label 10 comprises a substrate with one or more thermally sensitive coatings, e.g., permitting direct thermal printing 30 on the label 10 in a manner well known in the art. The label 10 may also include printed material such as a logo 40 added by direct thermal printing, inkjet printing, lithographic process, flexographic printing or the like. Conventional direct thermal printing paper can be used for the exemplary labels 10.

In the example shown in FIG. 1, the initial background color of the label 10 is white. The hidden opaque printing 20 would match this background color so as to be essentially invisible before the label 10 is exposed to excessive heat. In this example the color of the opaque printing 20 would be white. The visibility of the hidden opaque printing 20 in FIG. 1 is for illustration only, where again the opaque printing 20 would be substantially invisible in actual practice against the background of the label 10. The hidden printing 20 could be added to the label 10 by inkjet printing, for example.

Figure 2:
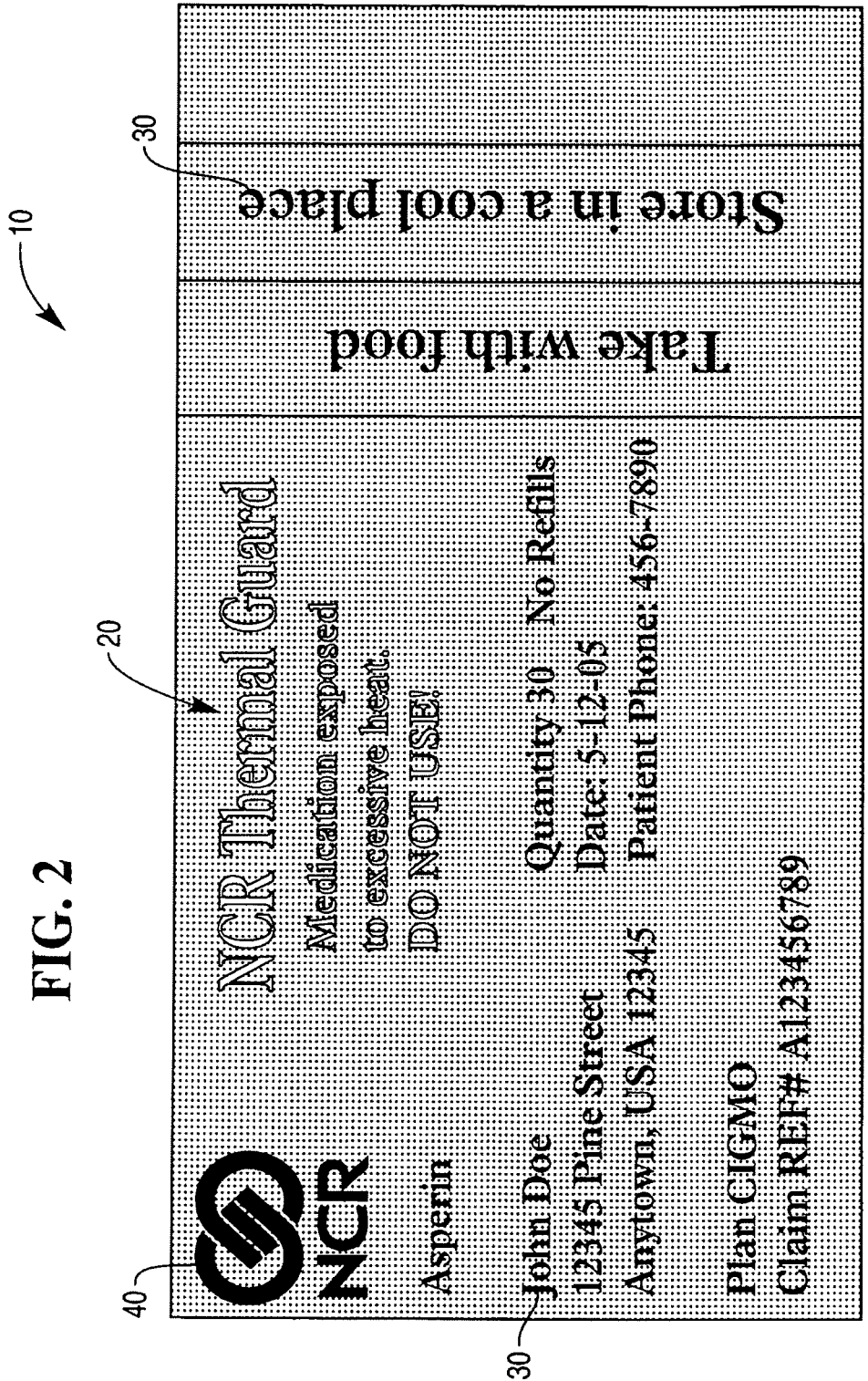
FIG. 2 illustrates the thermally sensitive label of FIG. 1 following exposure to excessive heat, where the opaque printing has been made visible.

When the label 10 is exposed to excessive heat, the background color of the label 10 turns dark, as shown in FIG. 2, exposing the opaque printing 20 and rendering it visible, e.g., to reveal a message. The illustrated label 10 in FIGS. 1 and 2 could be used, for example, for safe guarding medication in pill bottles from excessive thermal exposure. The safe guard would be an integral part of the label on the bottle. In this embodiment the opaque printing 20 is a warning message preferably pre-printed on a white direct thermal label 10 using opaque white ink. The white on white printing is initially invisible. When the label 10 is exposed to excessive temperature the entire label images, or turns dark. The initially invisible white printing 20 becomes visible. This is shown in FIGS. 1 and 2. The activation temperature when the label 10 turns dark can be selected based on requirements for safe guarding particular medication in containers to which the label 10 is applied.

The white warning message or printing 20 may be optimally placed on a portion of the label not thermally imaged by thermal printing 30 or printed with logo 40. This is depicted in FIG. 1. However by adjusting the opacity of the white ink it is possible to place the invisible print 20 on areas 30 of the label 10 that are thermally printed if desired. This can be accomplished by adjusting the opacity of the white to allow the thermally imaged areas 30 to appear gray through the white pre-printing. As long as the thermal printing is sparse an observer will not detect the hidden message 20 before heat activation.

The activation temperature for revealing the hidden message 20 can be adjusted by changing the thermal sensitivity of the label 10. The substantially opaque white message 20 may be applied over a protective layer as desired. Alternatively, or in addition, a substantially transparent protective layer may be applied to the label 10 on top of the printing 20. The label 10 is not limited to white thermal paper and the hidden message 20 is not limited to white opaque ink. Other colors of paper and inks may be used. Similarly, the label 10 is not limited to black thermal imaging, other imaging colors being possible.

In another application of a thermal label or thermal paper 10, the hidden message 20 could be used as a security feature. When the paper 10 is thermally printed an area can be intentionally thermal printed to expose the hidden print 20, authenticating the media.

The foregoing description above presents a number of specific embodiments or examples of a broader invention. The invention is also carried out in a wide variety of other alternative ways which have not been described here. Many other embodiments or variations of the invention may also be carried out within the scope of the following claims.

Figure 3:
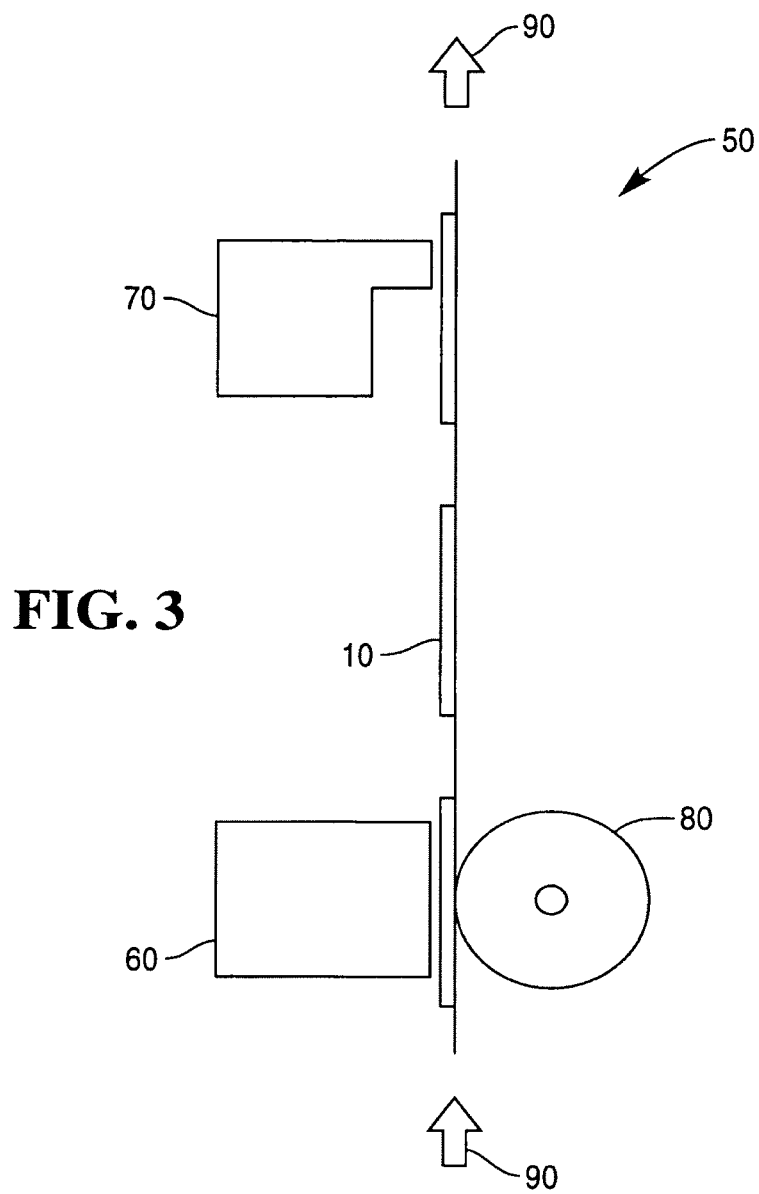
FIG. 3 shows schematically a direct thermal printer with an ink jet print head.

As shown in FIG. 3, a printer 50 for printing of time-temperature indicator labels 10 can be constructed using a direct thermal printing print head 60 to print first indicia 30 on the labels 10, and an ink jet print head 70 to print second indicia 20 on the labels 10, using well known print head technologies. The printer 50 includes a platen 80 opposing the thermal print head 60 and the labels 10 are presented for printing on a web moving through the printer 50 along a feed path 90. Such a printer 50 would comprise a supply of ink (not shown) for the ink jet print head 70, where the ink is of a color that substantially matches that of the thermal media elements 10 prior to activation due to excessive heat.

What is claimed is:

1. A method of hiding and revealing an authentication print to indicate whether a sheet media item is authentic, the method comprising:

printing with ink of a first color the authentication print on a first portion of the sheet media item having a thermally sensitive coating of an initial color which substantially matches the first color of the authentication print to render the first color of the authentication print substantially invisible against the initial color of the thermally sensitive coating and thereby to hide the authentication print;

applying heat to a second portion of the sheet media item which is different from the first portion of the sheet media item to provide a message of a second color on the second portion of the sheet media item, wherein the second color of the message on the second portion of the sheet media item is different from the first color of the authentication print on the first portion of the sheet media item; and at the same time heat is being applied to the second portion of the sheet media item, applying heat to the first portion of the sheet media item to change the thermally sensitive coating from the initial color which substantially matches the first color of the authentication print to a different color to render the first color of the authentication print visible against the different color of the thermally sensitive coating and thereby to reveal the authentication print to indicate that the sheet media item is authentic.

2. A method according to claim 1, wherein (i) the first color is a color which is substantially white, and (ii) the second color is a color which is other than substantially white.

3. A method according to claim 1, wherein the second color is a color which is substantially black.

4. A method according to claim 1, wherein (i) the first color is a color which is substantially white, and (ii) the second color is a color which is substantially black.

5. A method of hiding and revealing an authentication print to indicate whether a sheet media item is authentic, the method comprising:

printing with ink of a substantially light color the authentication print on a first portion of the sheet media item having a thermally sensitive coating of an initial color which substantially matches the substantially light color of the authentication print to render the substantially light color of the authentication print substantially invisible against the initial color of the thermally sensitive coating and thereby to hide the authentication print;

applying heat to a second portion of the sheet media item which is different from the first portion of the sheet media item to provide a message of a color which is a substantially dark color on the second portion of the sheet media item; and at the same time heat is being applied to the second portion of the sheet media item, applying heat to the first portion of the sheet media item to change the thermally sensitive coating from the initial color which substantially matches the substantially light color of the authentication print to a different color to render the substantially light color of the authentication print visible against the different color of the thermally sensitive coating and thereby to reveal the authentication print to indicate that the sheet media item is authentic.

6. A method according to claim 5, wherein the different color to which the thermally sensitive coating changes from the initial color is substantially black.

7. A method according to claim 5, wherein the substantially light color of the ink is a substantially white color.

8. A method according to claim 5, wherein (i) the different color to which the thermally sensitive coating changes from the initial color is substantially black, and (ii) the substantially light color of the ink is a substantially white color.

9. A method of hiding and revealing an authentication print to indicate whether a sheet media item is authentic, the method comprising:

printing with ink of a substantially white color the authentication print on a first portion of the sheet media item having a thermally sensitive coating of an initial color which substantially matches the substantially white color of the authentication print to render the substantially white color of the authentication print substantially invisible against the initial color of the thermally sensitive coating and thereby to hide the authentication print;

applying heat to a second portion of the sheet media item which is different from the first portion of the sheet media item to provide a message of a substantially black color on the second portion of the sheet media item; and at the same time heat is being applied to the second portion of the sheet media item, applying heat to the first portion of the sheet media item to change the thermally sensitive coating from the initial color which substantially matches the substantially white color of the authentication print to a different color to render the substantially white color of the authentication print visible against the different color of the thermally sensitive coating and thereby to reveal the authentication print to indicate that the sheet media item is authentic.

10. A method according to claim 9, wherein the different color to which the thermally sensitive coating changes from the initial color is substantially black.

11. A method according to claim 9, wherein the substantially white color of authentication print is a substantially opaque white color.

12. A method according to claim 9, wherein (i) the different color to which the thermally sensitive coating changes from the initial color is substantially black, and (ii) the substantially white color of the ink is a substantially opaque white color.

* * * * *